(12) United States Patent
Gill et al.

(10) Patent No.: US 11,198,817 B2
(45) Date of Patent: Dec. 14, 2021

(54) MALEIC ANHYDRIDE HOMOPOLYMER AND MALEIC ACID HOMOPOLYMER AND METHODS FOR PREPARING THEREOF, AND NON-PHOSPHORUS CORROSION INHIBITOR AND USE THEREOF

(71) Applicant: ECOLAB USA INC., St. Paul, MN (US)

(72) Inventors: Jasbir S. Gill, Naperville, IL (US); Peter E. Reed, Plainfield, IL (US); Santanu Banerjee, Magarpatta (IN); Anand Harbindu, Shahjahanpur (IN); Yinyin Tong, Shanghai (CN)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/768,089

(22) PCT Filed: Oct. 17, 2016

(86) PCT No.: PCT/CN2016/000575
§ 371 (c)(1),
(2) Date: Apr. 13, 2018

(87) PCT Pub. No.: WO2017/063308
PCT Pub. Date: Apr. 20, 2017

(65) Prior Publication Data
US 2018/0305617 A1    Oct. 25, 2018

Related U.S. Application Data

(63) Continuation of application No. PCT/CN2015/092090, filed on Oct. 16, 2015.

(51) Int. Cl.
*C09K 15/06* (2006.01)
*C08F 122/06* (2006.01)
(Continued)

(52) U.S. Cl.
CPC ........... *C09K 15/06* (2013.01); *C08F 2/10* (2013.01); *C08F 122/02* (2013.01);
(Continued)

(58) Field of Classification Search
CPC .......... C09K 15/06; C08F 2/10; C08F 122/02; C08F 122/06; C08F 4/40; C23F 11/08; C23F 11/173; C23F 11/124
See application file for complete search history.

(56) References Cited

U.S. PATENT DOCUMENTS 3,810,834 A * 5/1974 Jones et al. ............... C08F 8/12
210/698
3,897,209 A * 7/1975 Harris ..................... C23F 11/08
422/17

(Continued)

FOREIGN PATENT DOCUMENTS

CN        87103379 A      12/1987
CN      102730874 B   *   3/2015
(Continued)

OTHER PUBLICATIONS

International Search Report and Written Opinion for corresponding International Application No. PCT/CN2015/092090, 7 pages (dated Jul. 21, 2016).
(Continued)

*Primary Examiner* — Pamela H Weiss
(74) *Attorney, Agent, or Firm* — Eric D. Babych; Barnes & Thornburg LLP

(57) ABSTRACT

Maleic anhydride homopolymer corrosion inhibitors, maleic acid homopolymer corrosion inhibitors, methods for preparing the same, and methods of inhibiting corrosion are provided. The corrosion inhibitors may exclude phosphorus and may contain a hydrolysate of a maleic anhydride homopolymer or a hydrolysate of a maleic acid homopoly- (Continued)

mer. The maleic acid homopolymer may include from about 2 to about 5 maleic acid repeating units and the maleic anhydride homopolymer may include from about 2 to about 5 maleic anhydride repeating units.

8 Claims, 11 Drawing Sheets

(51) Int. Cl.
    *C08F 122/02*     (2006.01)
    *C23F 11/173*     (2006.01)
    *C23F 11/08*     (2006.01)
    *C08F 2/10*     (2006.01)
    *C23F 11/12*     (2006.01)
    *C08F 4/40*     (2006.01)

(52) U.S. Cl.
    CPC ............ *C08F 122/06* (2013.01); *C23F 11/08* (2013.01); *C23F 11/124* (2013.01); *C23F 11/173* (2013.01); *C08F 4/40* (2013.01)

(56) References Cited

U.S. PATENT DOCUMENTS

| | | | |
|---|---|---|---|
| 3,919,258 A | 11/1975 | Richardson et al. | |
| 3,943,083 A * | 3/1976 | Adams | C04B 24/2664 523/130 |
| 3,963,636 A * | 6/1976 | Harris | C02F 5/105 507/221 |
| 4,105,581 A * | 8/1978 | Sexsmith | C23F 11/08 252/181 |
| 4,126,549 A * | 11/1978 | Jones | C08F 8/12 210/701 |
| 4,297,237 A * | 10/1981 | Boffardi | C23F 11/08 106/14.12 |
| 4,317,744 A * | 3/1982 | Levi | C23F 11/10 252/389.22 |
| 4,401,587 A * | 8/1983 | Boffardi | C23F 11/10 106/14.12 |
| 4,442,298 A * | 4/1984 | Tou | C07C 51/56 549/252 |
| 4,446,045 A * | 5/1984 | Snyder | C02F 5/12 210/698 |
| 4,640,793 A * | 2/1987 | Persinski | C02F 5/10 210/696 |
| 4,670,514 A * | 6/1987 | Burke | C08F 8/12 525/327.7 |
| 4,713,195 A * | 12/1987 | Schneider | C02F 5/14 252/180 |
| 4,752,443 A | 6/1988 | Hoots et al. | |
| 4,798,683 A * | 1/1989 | Boffardi | C23F 11/08 252/389.54 |
| 4,936,987 A * | 6/1990 | Persinski | C02F 5/10 210/699 |
| 5,135,661 A * | 8/1992 | Patel | C02F 5/10 210/698 |
| 5,135,677 A | 8/1992 | Yamaguchi et al. | |
| 5,152,403 A * | 10/1992 | Patel | C02F 5/14 210/699 |
| 5,156,744 A | 10/1992 | Rideout et al. | |
| 5,171,451 A | 12/1992 | Khambatta et al. | |
| 5,747,619 A * | 5/1998 | Denzinger | C02F 1/042 526/318.5 |
| 2010/0273699 A1 * | 10/2010 | Kensicher | C11D 3/3757 510/231 |
| 2012/0083432 A1 * | 4/2012 | Hatasaki | C10M 173/02 508/176 |
| 2012/0161068 A1 * | 6/2012 | Greene | C02F 5/10 252/181 |
| 2015/0133357 A1 * | 5/2015 | Dotzauer | C11D 3/3765 510/218 |

FOREIGN PATENT DOCUMENTS

| | | | | |
|---|---|---|---|---|
| JP | 63-194799 A | | 8/1988 | |
| JP | 63194799 A | * | 8/1988 | ............. C23F 11/10 |
| JP | 2009-249735 A | | 10/2009 | |
| WO | WO-9118932 A1 | * | 12/1991 | ............... C08F 8/12 |
| WO | WO 2007/068176 A1 | | 6/2007 | |
| WO | WO-2008046304 A1 | * | 4/2008 | ....... H01L 21/02071 |

OTHER PUBLICATIONS

International Search Report and Written Opinion for corresponding International Application No. PCT/CN2016/000575, 9 pages (dated Dec. 29, 2016).

* cited by examiner

MALEIC ANHYDRIDE HOMOPOLYMER AND MALEIC ACID HOMOPOLYMER AND METHODS FOR PREPARING THEREOF, AND NON-PHOSPHORUS CORROSION INHIBITOR AND USE THEREOF

TECHNICAL FIELD

The present disclosure generally relates to compositions useful for inhibiting corrosion. In particular, the disclosure relates to corrosion inhibitor compositions that do not comprise phosphorus and methods for making and using the same.

BACKGROUND

Corrosion inhibitors commonly used in the related art contain phosphorus. However, due to an increasing concern about the environment, the requirements on the content of phosphorus in wastewater have become stricter and as a result, the use of phosphorus-containing corrosion inhibitors has been greatly limited.

Polymaleic acids can be used as corrosion inhibitors. The methods for the preparation of polymaleic acid include an organic solvent polymerization method and an aqueous solution polymerization method. At present, most commercially available polymaleic acids (e.g., Belclene 200™) have a relatively broad weight-average molecular weight distribution, such as around 1000 Daltons (Da), and around 8 repeating units.

BRIEF SUMMARY

The present disclosure relates to corrosion inhibitor compositions, methods of manufacturing the corrosion inhibitor compositions, and methods of inhibiting corrosion with the corrosion inhibitor compositions.

In one embodiment, the present disclosure provides a method of inhibiting corrosion of a metallic surface in an aqueous industrial system. The method comprises adding a corrosion inhibitor to the aqueous industrial system, wherein the corrosion inhibitor comprises a maleic anhydride homopolymer having from about 2 to about 5 maleic anhydride repeating units, wherein a weight average molecular weight of the maleic anhydride homopolymer is in a range of about 200 to about 600 Da.

In another embodiment, the present disclosure provides a method of inhibiting corrosion of a metallic surface in an aqueous industrial system. The method comprises adding a corrosion inhibitor to the aqueous industrial system, wherein the corrosion inhibitor comprises a maleic acid homopolymer having from about 2 to about 5 maleic acid repeating units, wherein a weight average molecular weight of the maleic acid homopolymer is in a range of about 200 to about 600 Da.

In an additional embodiment, the present disclosure provides a method of inhibiting corrosion of a metallic surface in an aqueous industrial system. The method comprises adding a corrosion inhibitor to the aqueous industrial system, wherein the corrosion inhibitor comprises a member selected from the group consisting of a hydrolysate of a maleic anhydride homopolymer, a hydrolysate of a maleic acid homopolymer, and any combination thereof, wherein a molecular weight of the hydrolysate of the maleic anhydride homopolymer or the hydrolysate of the maleic acid homopolymer is in a range from about 200 to about 600 Da.

In a further embodiment, the present disclosure provides for the use of a corrosion inhibitor to inhibit corrosion of a metallic surface in an aqueous industrial system, wherein the corrosion inhibitor comprises a member selected from the group consisting of a maleic anhydride homopolymer, a maleic acid homopolymer, a hydrolysate of a maleic anhydride polymer, a hydrolysate of a maleic acid homopolymer, and any combination thereof.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWING FIGURES

The drawing figures are used for further illustration of the various embodiments disclosed herein. The drawings are used in combination with specific examples to explain certain embodiments of the present disclosure and are not meant to limit the disclosure. In the drawing figures.

Figure 14:
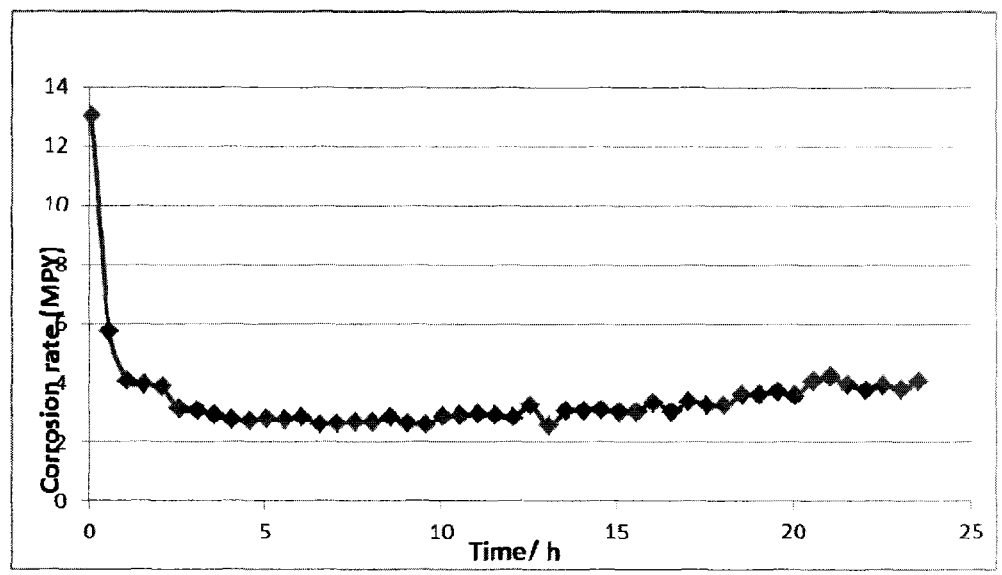
Figure 15:
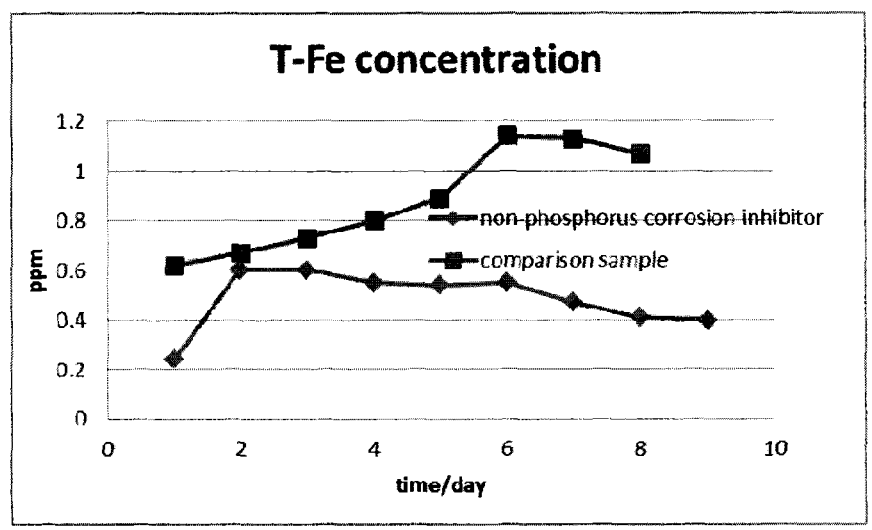

FIG. 14 shows the tendency of the corrosion rate variation with time of a coupon in the test sample comprising the product prepared by Example 2-3 via an electrochemical method; and FIG. 15 shows the tendency of the total iron ion concentration (T-Fe) variation with time in the water solution comprising the non-phosphorus corrosion inhibitor including the product prepared by Example 2-1 or the comparison sample via a pilot cooling tower (PCT) test method.

DETAILED DESCRIPTION

Various embodiments are described below. The relationship and functioning of the various elements of the embodiments may better be understood by reference to the following detailed description. However, embodiments are not limited to those explicitly described below.

Certain embodiments of the present disclosure provide a corrosion inhibitor composition comprising a maleic anhydride homopolymer and/or a maleic acid homopolymer. The maleic anhydride homopolymer and the maleic acid homopolymer have a relatively low molecular weight and a relatively narrow molecular weight distribution. The embodiments of the present disclosure also provide a non-phosphorus corrosion inhibitor and the use thereof, and the non-phosphorus corrosion inhibitor may comprise the hydrolysate of the maleic anhydride homopolymer and/or the maleic acid homopolymer.

The maleic acid homopolymer provided by certain embodiments of the present disclosure has 2 to 5 repeating units of maleic acid and a weight average molecular weight of about 200 to about 600 Da.

The maleic acid homopolymer provided by certain embodiments of the present disclosure, due to having a low molecular weight and a relatively narrow molecular weight distribution, can easily form a uniform protective film on a metallic surface, thereby effectively inhibiting the metal from corroding. For example, the maleic acid homopolymer provided by the embodiments of the present disclosure can effectively inhibit ferrous metals from corrosion. Compared with the prior art inhibitors, the presently disclosed corrosion inhibitors comprising the maleic acid homopolymer and/or the maleic anhydride homopolymer exhibit a better corrosion resistance and achieve a corrosion rate of less than 3 mpy (mil inch per year).

Furthermore, the corrosion inhibitors provided by the embodiments of the present disclosure can also be used as non-phosphorus-containing corrosion inhibitors, which are environmental friendly and can be widely used.

In one aspect, the present disclosure provides a corrosion inhibitor comprising a maleic anhydride homopolymer having from 2 to 5 repeating units of maleic anhydride and a weight average molecular weight in the range of about 200 to about 600 Da.

In some embodiments, the number of repeating units of maleic anhydride may be in the range of 2 to 4, such as 2 or 3.

In some embodiments, the weight average molecular weight of the maleic anhydride homopolymer may be in the range of about 200 to about 500 Da.

In some embodiments, the homopolymer may comprise a "capping group." The capping group of the maleic anhydride homopolymer may be selected from, for example, benzyl, methylbenzyl, phenylethyl and hydrogen.

In another aspect, the present disclosure provides a method for preparing the maleic anhydride homopolymer. The method may comprise oligomerizing maleic anhydride in an aromatic organic solvent in the presence of an initiator, under an inert atmosphere, and at boiling point temperature of the aromatic organic solvent. The method also comprises separating the resulting product from the solvent.

The progress of the oligomerization reaction can be monitored by detecting the content of the maleic anhydride monomer in the reaction mixture by liquid chromatography.

In some embodiments, the aromatic organic solvent may be selected from the group consisting of toluene, xylene, mesitylene, ethyl benzene, and any combination thereof.

In some embodiments, the initiator may be selected from the group consisting of azobisisobutyronitrile, benzoyl peroxide, di-t-butyl peroxide, dicumyl peroxide, di-t-amyl peroxide, and any combination thereof.

In some embodiments, the molar ratio of the maleic anhydride to the initiator may be in the range of about 1:0.01 to about 1:0.2, such as about 1:0.1.

In a further aspect, the present disclosure provides a maleic acid homopolymer having from 2 to 5 repeating units of maleic acid and a weight average molecular weight of about 200 to about 600 Da, such as about 500 Da.

In some embodiments, the number of repeating units of maleic acid may be in the range of 2 to 3. In some embodiments, the weight average molecular weight of the maleic acid homopolymer may be in the range of about 200 to about 400 Da.

In some embodiments, the maleic acid homopolymer may comprise a capping group selected from the group consisting of benzyl, methylbenzyl, phenylethyl, hydrogen, and any combination thereof.

Any of the presently disclosed corrosion inhibitor compositions comprising maleic acid homopolymers and/or maleic anhydride homopolymers may be used in methods for inhibiting corrosion of metallic surfaces, such as metallic surfaces contained in aqueous industrial systems. The corrosion inhibitors may be added to the systems by any means known in the art, such as manual or automatic addition, and may be added in any amount necessary to achieve the desired level of corrosion inhibition.

The present disclosure also provides methods for preparing the corrosion inhibitor compositions. In one aspect, a method for preparing a maleic acid homopolymer comprises polymerizing maleic acid as a monomer in an aqueous solution having a pH in the range of about 3 to about 5 in the presence of a chain transfer agent, a catalyst and a redox initiator.

In some embodiments, the method may comprise adding the chain transfer agent, the catalyst and a first redox initiator to an aqueous solution containing maleic acid. The pH of the resulting mixture may be adjusted to about 3, 4 or 5, and under an inert atmosphere, a second redox initiator may be added into the aqueous solution so the maleic acid is polymerized.

In some embodiments, the amount of the chain transfer agent may be in the range of about 0.05 mol % to about 0.3 mol %, such as about 0.14 mol %. The amount of the catalyst may be in the range of about 0.01 mol % to about 0.1 mol %, such as about 0.015 mol %. The amount of the first redox initiator may be in the range of about 1 mol % to about 5 mol %, such as about 4.45 mol %, based on the amount of the maleic acid.

In some embodiments, the chain transfer agent, the catalyst, and the first redox initiator may be added at a temperature in the range of about 45° C. to about 55° C., such as about 50° C., and the obtained aqueous solution of maleic acid may be agitated for about 10 to about 60 minutes.

In some embodiments, the pH of the aqueous solution may be adjusted by adding an alkali solution such that the pH is in the range of about 3 to about 5, and the temperature of the aqueous solution may be maintained below about 85° C.

In some embodiments, the molar ratio of the second redox initiator to the maleic acid may be in the range of about 0.5:1 to about 2:1, such as about 1:1.34.

In some embodiments, during the addition of the second redox initiator, the temperature of the solution may be maintained in the range of about 80° C. to about 130° C., such as about 80° C., about 90° C., or about 85° C. The addition may be performed over the course of about 3 to 4 hours, for example. After the addition is completed, the mixture may be maintained at a temperature of about 80° C. to about 100° C. for about 2 to about 3 hours.

In some embodiments, the chain transfer agent may be selected from the group consisting of sodium iodide, potassium iodide, and an organic iodide compound.

In some embodiments, the catalyst may be selected from one or more inorganic and organic salts of Group VIII and Group IB metals in the periodic table of elements. The catalyst may comprise, for example, iron salts and/or copper salts.

In some embodiments, the redox initiator may be selected from the group consisting of hydrogen peroxide, sodium persulphate, ammonium persulphate, potassium persulphate, and any combination thereof.

In some embodiments, the first redox initiator and the second redox initiator may be the same or they may be different. In some embodiments, the first redox initiator and the second redox initiator may be independently selected from the group consisting of hydrogen peroxide, sodium persulphate, ammonium persulphate, potassium persulphate, and any combination thereof.

In an additional aspect, the present disclosure provides a non-phosphorus corrosion inhibitor comprising, as an active ingredient, a hydrolysate of any of the maleic anhydride homopolymers disclosed herein and/or a hydrolysate of any of the maleic acid homopolymers disclosed herein. In some embodiments, the non-phosphorus corrosion inhibitor may further comprise one or more additional corrosion inhibitors selected from the group consisting of zinc salts, molybdates, tungstate, silicate, and any combination thereof. In some embodiments, the weight ratio of the active ingredient to the additional corrosion inhibitors may be in the range of about 1:0.02 to about 1:50.

In a further aspect, the present disclosure provides for the use of the non-phosphorus corrosion inhibitor of any of the embodiments of the present disclosure for inhibiting corrosion if a metallic surface, for example, in an industrial aqueous system.

When the hydrolysate of the maleic anhydride homopolymer and/or the maleic acid homopolymer is used as a non-phosphorus corrosion inhibitor, the resulting non-phosphorus corrosion inhibitor can exhibit an excellent corrosion inhibition effect. Even if the concentration of the active ingredient of the maleic acid homopolymer and/or maleic anhydride homopolymer is reduced to about 5 ppm or perhaps less, a good corrosion inhibition effect can still be obtained.

In some embodiments, a method for preparing the maleic acid homopolymer may comprise dissolving maleic anhydride in deionized water and heating the resulting solution to between about 40° C. and about 60° C., such as about 50° C., such that the maleic anhydride is hydrolyzed to form maleic acid. A chain transfer agent, a catalyst, and a first redox initiator may be added to the solution and the resulting mixture may be stirred at a constant temperature. The pH of the mixture may be adjusted by adding an alkaline aqueous solution. The pH may be adjusted in a range between about 3 and 5 and the temperature of the solution may be maintained between about 80° C. and about 100° C., such as at about 80° C., 85° C., or about 90° C. A second redox initiator may be added to the solution, under an inert atmosphere, while the temperature is in the range of about 80° C. to about 100° C. for about 2 to 3 hours.

In the embodiment where KI or NaI is used as the chain transfer agent, $I_2$ and OH free radicals are produced upon a redox reaction in the reaction system. As a result, the reaction mixture becomes a red and/or brown color due to the presence of the $I_2$. As the redox reaction is preformed, the reaction mixture gradually becomes light yellow.

Since the step of adjusting pH is exothermic, if the adjusting step cannot be controlled properly, the temperature of the reaction mixture will increase sharply. Therefore, during the adjustment of pH, the temperature of the reaction mixture could be controlled properly such that the temperature is maintained in the range of about 80° C. to about 130° C. Furthermore, in the embodiment where the pH is adjusted by adding a NaOH or KOH aqueous solution, a precipitate may form due to the production of a maleate salt (maleate monosodium salt or maleate mono potassium salt) having a low solubility in water.

If the second the redox initiator is added too quickly, the temperature of the reaction mixture may suddenly rise. In such an event, $I_2$ can be observed in the inner surface of the condenser and a precipitate could also be observed after the solution is cooled to room temperature, which indicates a failure of the reaction.

Without limitation to any theory, in the method for preparing a maleic acid homopolymer, the pH of the aqueous solution may be controlled within the range of about 3 to about 5, whereby the dissolution and precipitation of the maleate salt in water reach an equilibrium. As the polymerization reaction of the maleic acid monomer is performed, the maleic acid monomer dissolved in the water is polymerized gradually and, as a result, the equilibrium moves to dissolution of the maleate salt in water and the amount of the precipitated maleate is reduced gradually, until the solid precipitation disappears. Thereby, the polymerization reaction is complete.

Furthermore, in the method for preparing a maleic acid homopolymer, a chain transfer agent can be used. The inventors unexpectedly discovered that when the amount of the chain transfer agent is too high, the polymerization reaction is difficult to carry out and, as a result, the molecular weight of the resulting polymer may be too low. When the amount of the chain transfer agent is too low, the polymerization reaction occurs to a greater extent and, as a result, the molecular weight of the resulting polymer may be too high. Therefore, the amount of the chain transfer agent needs to be controlled in a specific range, so as to obtain a maleic acid homopolymer with a weight average molecular weight in the ranges defined in the present application. Optionally, the amount of the chain transfer agent may be in the range of about 0.05 mol % to about 0.3 mol %, such as about 0.14 mol %, based on the amount of the maleic acid.

Moreover, the maleic anhydride homopolymers and the maleic acid homopolymers provided by the present disclosure may have a relatively low molecular weight and/or a relatively narrow molecular weight distribution. For example, it can be seen from Example 1-1 to Example 1-5 presented below that the maleic anhydride homopolymer may have from 2 to 4 repeating units of maleic anhydride and it can be seen from Example 2-1 to Example 2-3 that the maleic acid homopolymer may have 2 to 3 repeating units of maleic acid. Furthermore, since an acid can be obtained by hydrolization of the corresponding anhydride, after the maleic anhydride homopolymer is hydrolyzed, a maleic acid homopolymer having the same number of repeating units can be obtained.

The maleic acid homopolymers provided by the present disclosure, due to having a low molecular weight and a relatively narrow molecular weight distribution, can easily form a uniform protective film on a metallic surface, thereby effectively inhibiting corrosion of the metal.

The presently disclosed corrosion inhibitors can be used in any environment where metallic surfaces may need to be protected against corrosion. Manual and/or automated methods may be used to add the corrosion inhibitors to industrial systems including, but not limited to, cooling water systems, boiler water systems, wastewater treatment systems, pulp and paper systems, and membrane separation systems used by, for example, the aerospace industry, chemical industry, oil and gas industry, pharmaceutical industry, mining and primary metals industries, power industry, food and beverage industry, medium and light manufacturing industries, marine industry, pulp and papermaking industry, commercial building and educational facilities, hospital and medical centers, district heating and cooling, hotels, resorts, and hospitality facilities.

EXAMPLES

To test the effectiveness of the corrosion inhibitors, electrochemical test methods were utilized. Electrochemical measurements were carried out in a conventional three electrode glass corrosion cell at about 50° C. with a graphite electrode and an AgCl/Ag reference electrode. The working electrode was cut from a mild steel tube and was embedded in Teflon. The exposed surface of the working electrode was 5 cm². Prior to all measurements, electrodes were polished with 600 grade sandpaper.

The corrosion rate was obtained by measuring polarization resistance at a potential scan rate of 0.1 mV/second within ±20 mV of the corrosion potential (Ecorr) from the cathodic region to the anodic region with an electrochemical testing instrument.

Pilot cooling tower (PCT) test methods were also utilized. The PCT methods were performed according to HG/T 2160-2008 of Chemical Industry Standard of China.

Additionally, beaker test methods were carried out according to GB/T18175-2000 of National Standard of China. Specifically, the beaker test methods were carried out at temperatures of about 45° C., rotating speeds of about 100~150 RPM, and time periods of about 3 days. For an initial step of preparing a water sample having zero pH, 2 L of RO water was added into each of 5 beakers, then, in each beaker, a stock solution containing inorganic salts which have a corresponding volume (the inorganic salts were $CaCl_2$, $MgCl_2$/$MgSO_4$, NaCl, $Na_2SO_4$, etc.) was added to prepare the water chemistry needed (except for the alkalinity). The water bath was turned on and maintained at about 45° C. If a silicate was necessary as an inorganic salt, silicate could be added first followed by acid addition to adjust the pH.

A chemical product to be tested in corresponding dosage was added into the above solution. If necessary, the chemical product was first mixed with a dispersant. Then, the pH of the solution was adjusted to about 6.5 by adding 0.1 mol/L of NaOH or $H_2SO_4$ aqueous solution, so as to eliminate the influence of the alkalinity/acidity on the final solution. After that, an $NaHCO_3$ aqueous solution was added to adjust the alkalinity such that it corresponds to the alkalinity of the aqueous solution to be simulated.

If the pH needed to be controlled during the test, the pH was adjusted by adding 0.1 mol/L of NaOH or $H_2SO_4$ aqueous solution, until the pH reached the set-point. Then, the resulting solution was left to stand for 1~2 hours so as to attain an equilibrium. The pH was checked and/or adjusted again before a coupon (an iron flake) was inserted. If pH control is not necessary, the coupon could be directly inserted about 1 to 2 hours after the solution attains equilibrium. The code and the weight of the coupon were recorded before the test.

During the test, due to the water evaporation, the volume of the water solution was compensated to 2 L twice per day. If pH changed, 0.1 mol/L of NaOH or $H_2SO_4$ aqueous solution was used to maintain the pH at the set-point.

The coupon was rotated in the corrosion environment for 3 days. No chemical compensation was provided during the three days except in some special cases as noted. The coupons were taken out after the test was finished. The coupons were cleaned by using a 2.4 mol/L hydrochloric acid aqueous solution comprising 0.8 wt % hexamethylenetetramine as a corrosion inhibitor. Then, the coupons were rinsed with RO water and acetone. The coupons were dried in a 60° C. oven for at least 2 hours before weighing. Typically, in order to reduce the time for acid cleaning, the red rust on the coupons could be physically removed before the acid cleaning. The time for cleaning each coupon in acid can be reduced to less than 1 minute.

Before molecular measurement through ESI Mass, the products of the following examples were dissolved with water so as to prepare samples to be measured. Thus, the results shown by MS spectrum are the information of the hydrolyzed products of the corresponding maleic anhydride polymers.

Example 1-1

(6.04 g) 0.06 mol of maleic anhydride in 210 mL of toluene solvent was refluxed under $N_2$ atmosphere. A solution of (1.0 g) 0.006 mol of AIBN as an initiator dissolved in 40 mL of toluene solvent was added to the toluene solution containing maleic anhydride for a period of 4 hours. Refluxing was continued for further 8 hours and the obtained polymer was separated from the solution. Excess solvent was distilled off and a sample of the polymer obtained was recrystallized in $CHCl_3$. The product was a white crystalline polymaleic anhydride. The MS figure of the resulted product is shown in FIG. 1.

Figure 1:
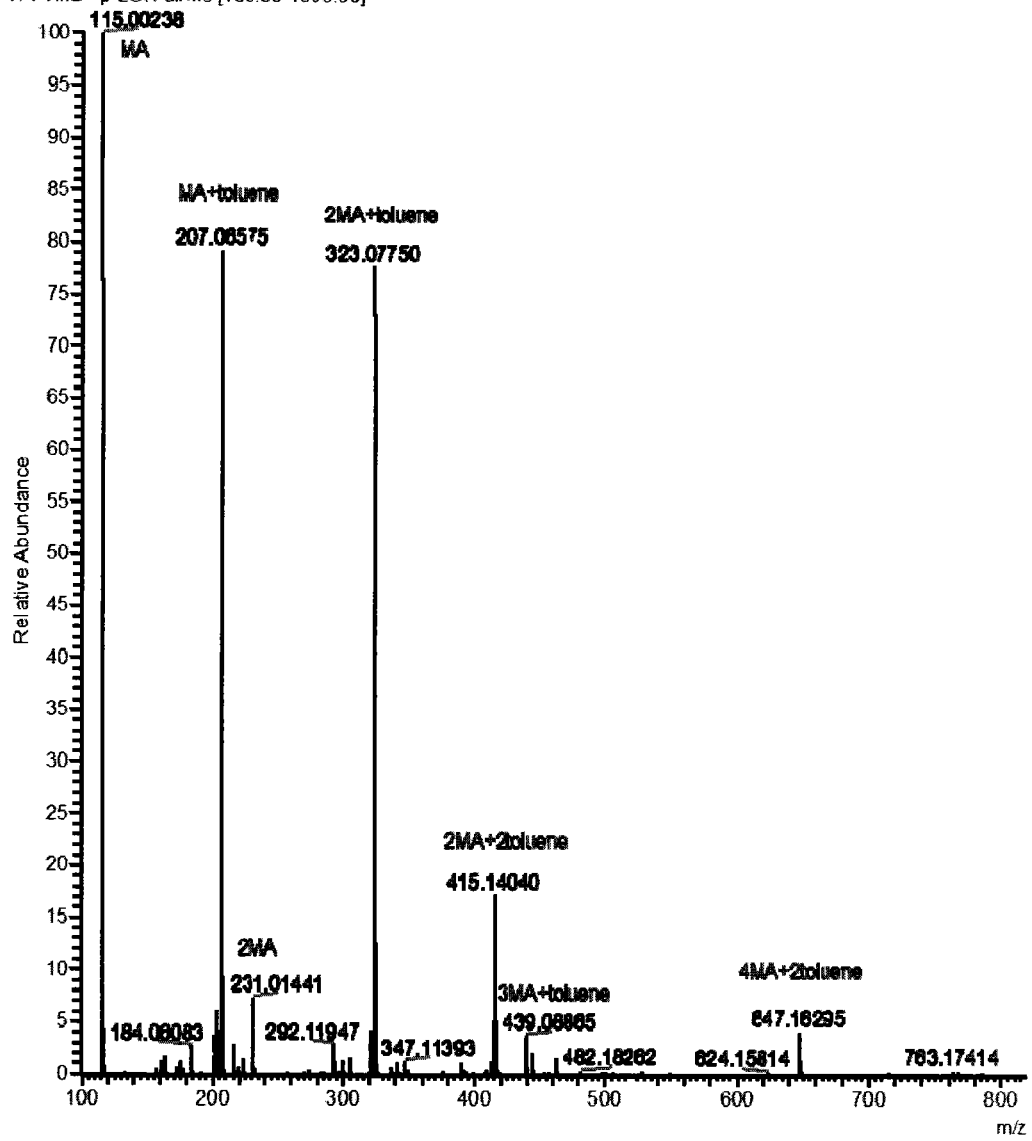
FIG. 1 is an MS spectrum of the product prepared by Example 1-1.

It can be seen from FIG. 1 that the major products in the sample produced by using AIBN as the initiator are monomer of maleic acid and dimer of maleic acid capped by a benzyl group (i.e., the number of the repeating units of maleic acid is 2). The product also comprises relatively smaller amounts of the trimer and tetramer of maleic acid capped by a benzyl group (i.e., the number of the repeating units of maleic acid is 3 or 4).

Example 1-2

Figure 2:
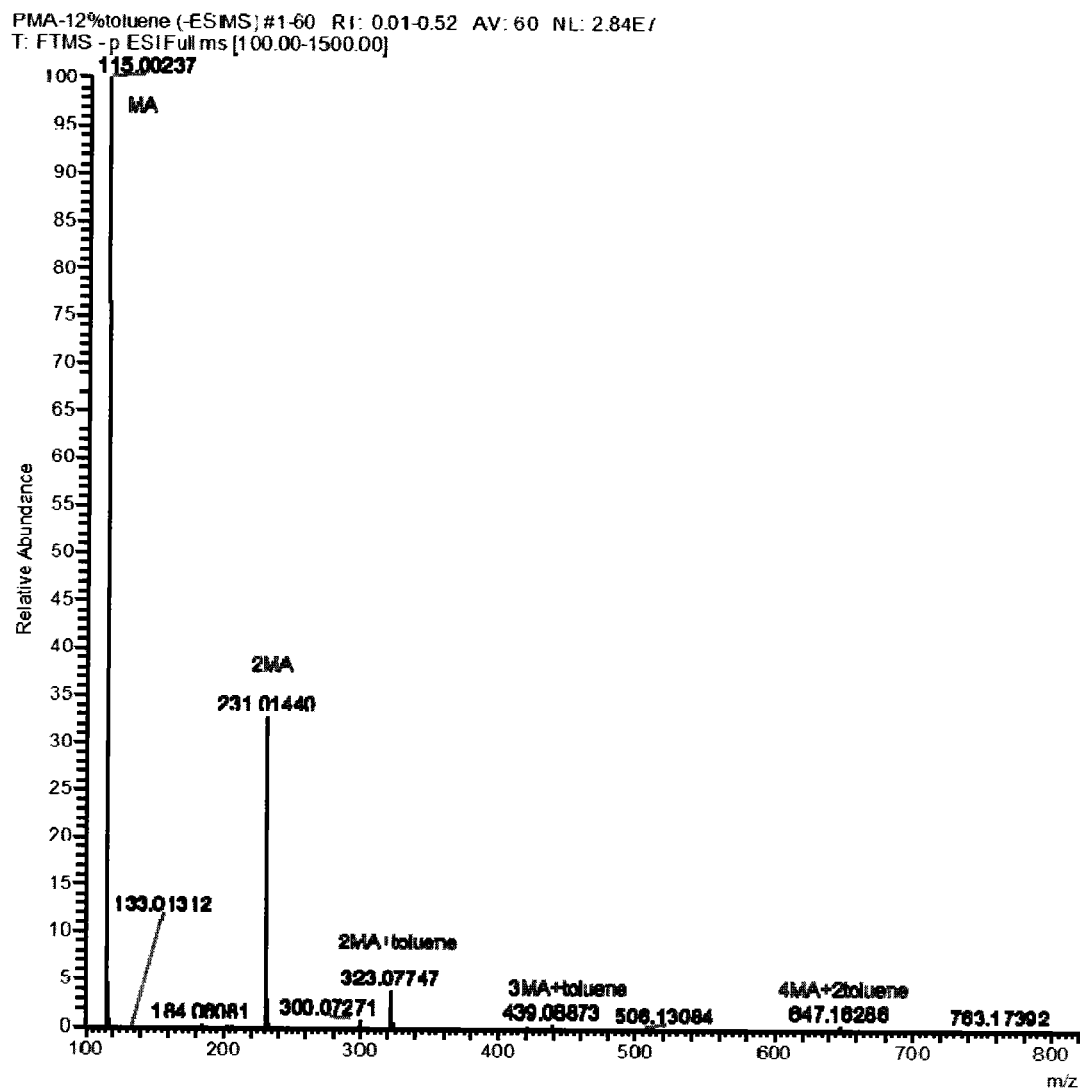
FIG. 2 is an MS spectrum of the product prepared by Example 1-2.

(30.2 g) 0.308 mol of maleic anhydride in 210 mL of toluene solvent was refluxed under $N_2$ atmosphere. (10.0 g) 0.06 mol of AIBN as an initiator dissolved in 40 mL of toluene solvent was added to the toluene solution containing maleic anhydride for a period of 4 hours. Refluxing was continued for further 8 hours and the obtained polymer was separated from the solution. Excess solvent was distilled off and a sample of the polymer so obtained was recrystallized in $CHCl_3$. The product was a yellowish-brown colored crystalline polymaleic anhydride. The MS figure of the resulted product is shown in FIG. 2. It can be seen from FIG. 2 that the major products in the sample produced by using AIBN as the initiator are the dimer of maleic acid capped by a benzyl group (i.e., the number of the repeating units of maleic acid is 2). The trimer and tetramer of maleic acid capped by a benzyl group are also present (i.e., the number of the repeating units of maleic acid is 3 or 4).

Example 1-3

Figure 3:
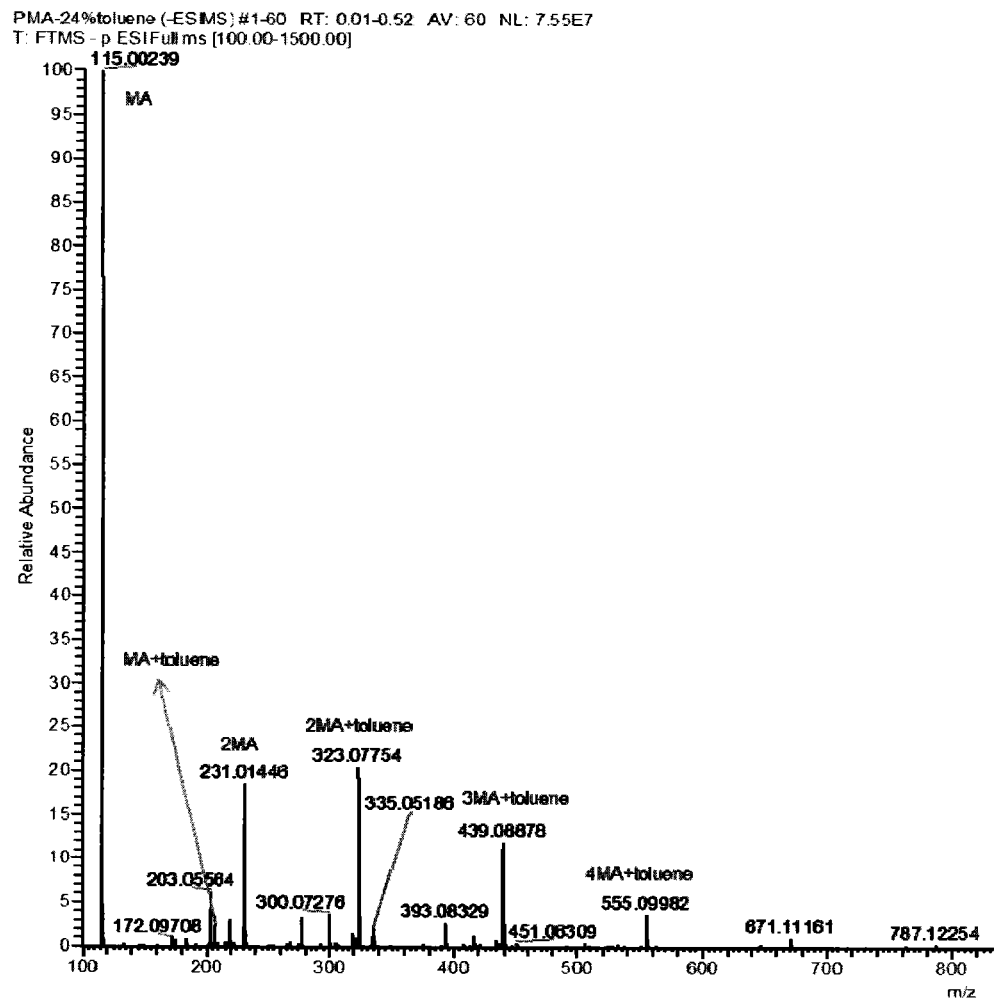
FIG. 3 is an MS spectrum of the product prepared by Example 1-3.

(60.4 g) 0.6 mol of maleic anhydride in 210 mL of toluene solvent was refluxed under $N_2$ atmosphere. (1.0 g) 0.006 mol of AIBN as an initiator dissolved in 40 mL of toluene solvent was added to the toluene solution containing maleic anhydride for a period of 4 hours. Refluxing was continued for further 8 hours and the obtained polymer was separated from the solution. Excess solvent was distilled off and a sample of the polymer so obtained was recrystallized in $CHCl_3$. The product was a brown colored crystalline polymaleic anhydride. The MS figure of the resulted product is shown in FIG. 3. It can be seen from FIG. 3 that the major products in the sample produced by using AIBN as the initiator are the dimers, trimmers, and tetramers of maleic acid, some of which are capped by a benzyl group (i.e., the number of the repeating units of maleic acid is 2-4).

Example 1-4

Figure 4:
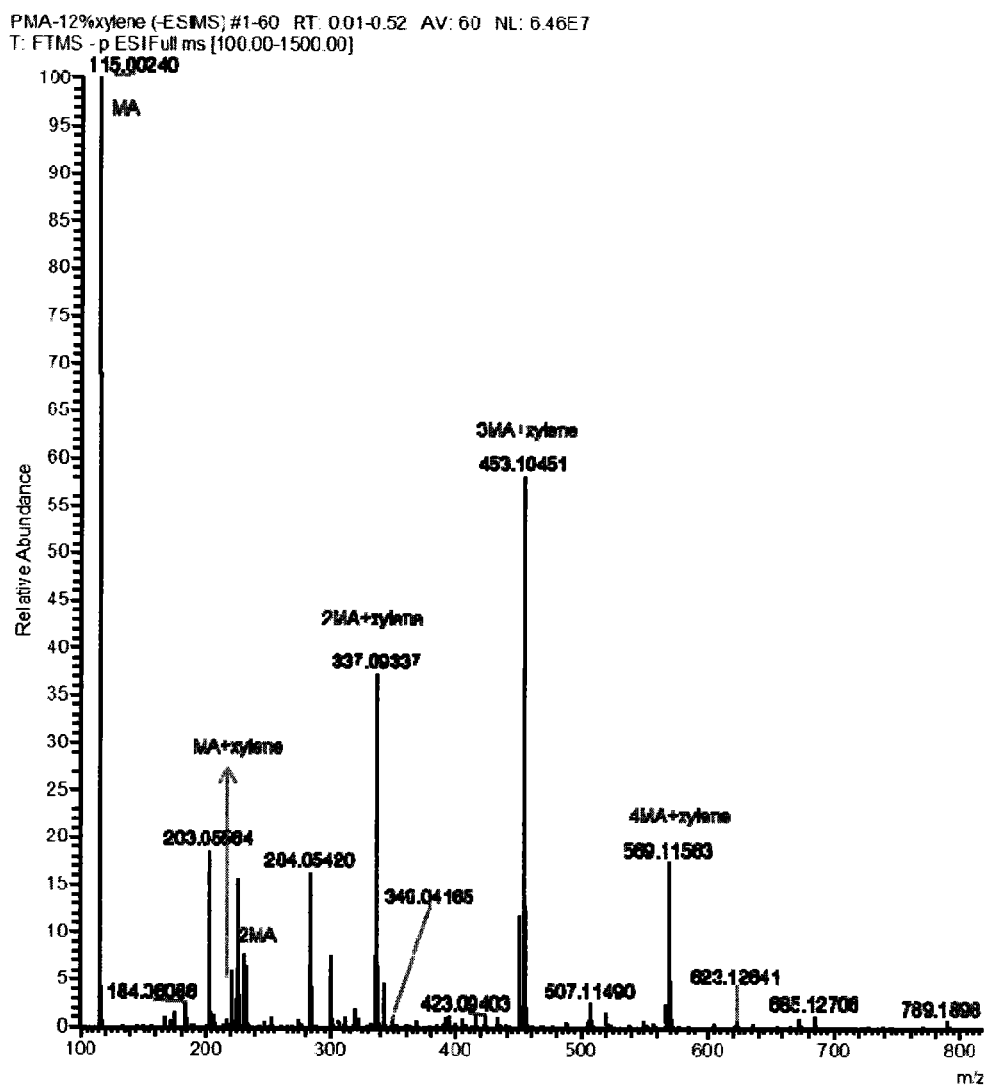
FIG. 4 is an MS spectrum of the product prepared by Example 1-4.

This example is performed in the same manner as example 1-2, except that toluene solvent was replaced with the same amount of xylene solvent. The MS figure of the resulted product is shown in FIG. 4. It can be seen from FIG. 4 that the major products in the sample produced by using AIBN as the initiator are the dimer of maleic acid capped by xylyl group (i.e., the number of the repeating units of maleic acid is 2), the trimer of maleic acid capped by xylyl group (i.e., the number of the repeating units of maleic acid is 3), and the tetramer of maleic acid capped by xylyl group (i.e., the number of the repeating units of maleic acid is 4).

Example 1-5

Figure 5:
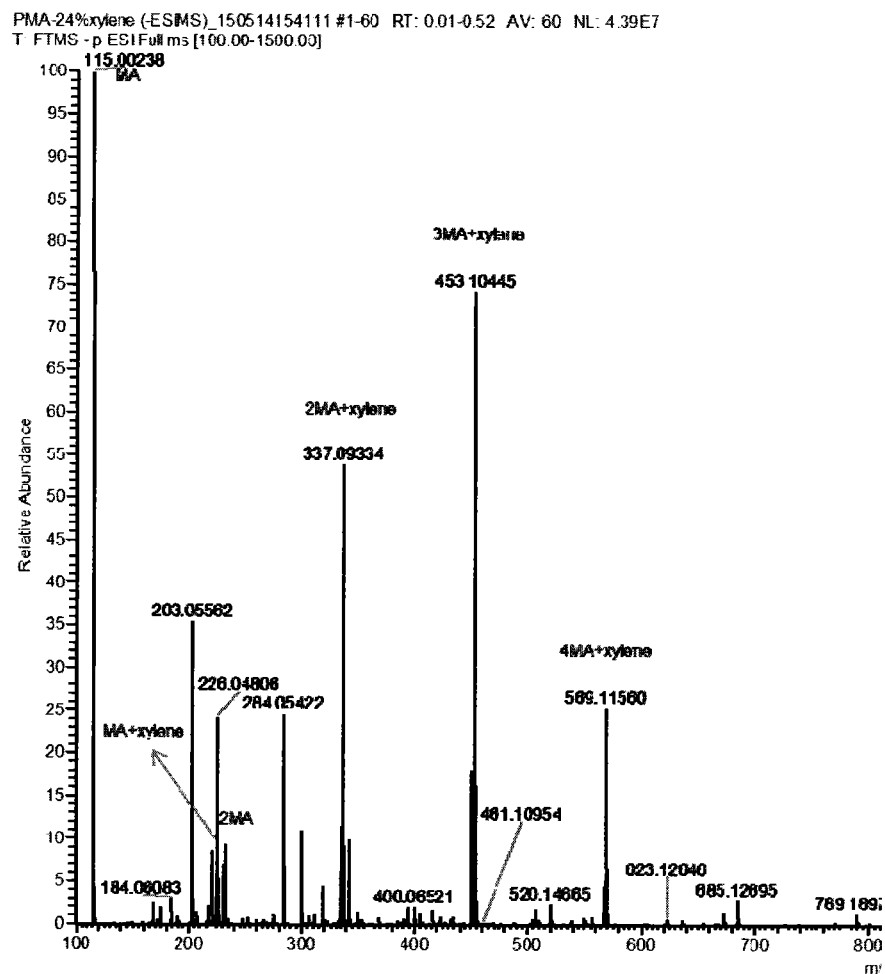
FIG. 5 is an MS spectrum of the product prepared by Example 1-5.

This example is performed in the same manner as example 1-3, except that xylene in the same amount was used as a solvent. The MS figure of the resulted product is shown in FIG. 5. It can be seen from FIG. 5 that the major products in the sample produced by using AIBN as the initiator are the dimer of maleic acid capped by xylyl group (i.e., the number of the repeating units of maleic acid is 2), the trimer of maleic acid capped by xylyl group (i.e., the number of the repeating units of maleic acid is 3), and the tetramer of maleic acid capped by xylyl group (i.e., the number of the repeating units of maleic acid is 4).

Test Examples 1: Electrochemical Test

Test Example 1-1

The corrosion rate of a coupon in the test sample was detected by the electrochemical test method. The test sample comprised (based on the total weight of the solution) 25 ppm of the product prepared by example 1-3 and soft water. Ions and pH of the soft water are shown in Table 1. An iron flake coupon was used.

TABLE 1

| | |
|---|---|
| $Ca^{2+}$ (ppm as $CaCO_3$) | 100 |
| $Mg^{2+}$ (ppm as $CaCO_3$) | 50 |
| M-A (alkalinity) (ppm as $CaCO_3$) | 100 |
| $Cl^-$ (ppm as ion) | 200 |
| $SO_4^{2-}$ (ppm as ion) | 100 |
| pH | 8~8.3 |

Figure 6:
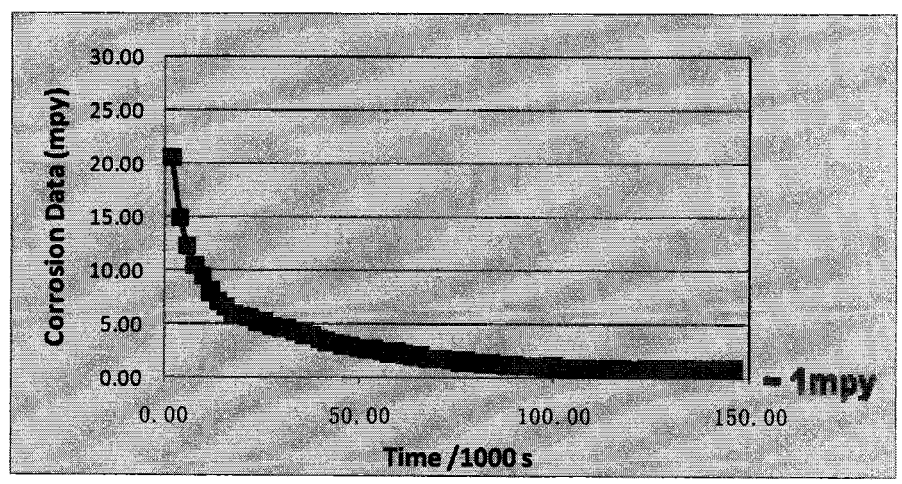
FIG. 6 shows the tendency of the corrosion rate variation with time of a coupon in the test sample comprising the product prepared by Example 1-3 via an electrochemical method.

The test results are shown in FIG. 6. FIG. 6 shows the tendency of the corrosion rate variation with time of the coupon in the test sample comprising the product prepared by Example 1-3 of the present invention via electrochemical method.

It can be seen from FIG. 6 that the initial corrosion rate is about 20 mpy because the metal surface is activated, but the corrosion rate rapidly decreases within 25 thousand seconds (1000 s) and stays steady at less than 1 mpy after 100 thousand seconds. It is indicated that the product prepared by example 1-3, namely the maleic acid homopolymer, has a good corrosion inhibition effect as a non-phosphorus corrosion inhibitor.

Test Example 1-2

The corrosion rate of a coupon in the test sample was detected by the electrochemical test method. The test sample comprised (based on the total weight of the solution) 6 ppm of an AA/AMPS (acrylic acid/2-acrylamido-2-methylpropane sulfonic acid) polymer, 10 ppm of product prepared in example 1-2 and 2 ppm of $ZnCl_2$ as Zn ion, and soft water or high chloride water. Ions and pH of the soft water are shown in Table 1. Ions and pH of the high chloride water are shown in Table 2. An iron flake coupon was used.

TABLE 2

| | |
|---|---|
| $Ca^{2+}$ (ppm as $CaCO_3$) | 500 |
| $Mg^{2+}$ (ppm as $CaCO_3$) | 380 |
| M-A (ppm as $CaCO_3$) | 200 |
| $Cl^-$ (ppm as ion) | 600 |
| $SO_4^{2-}$ (ppm as ion) | 600 |
| pH | 8.5~8.8 |

Figure 7:
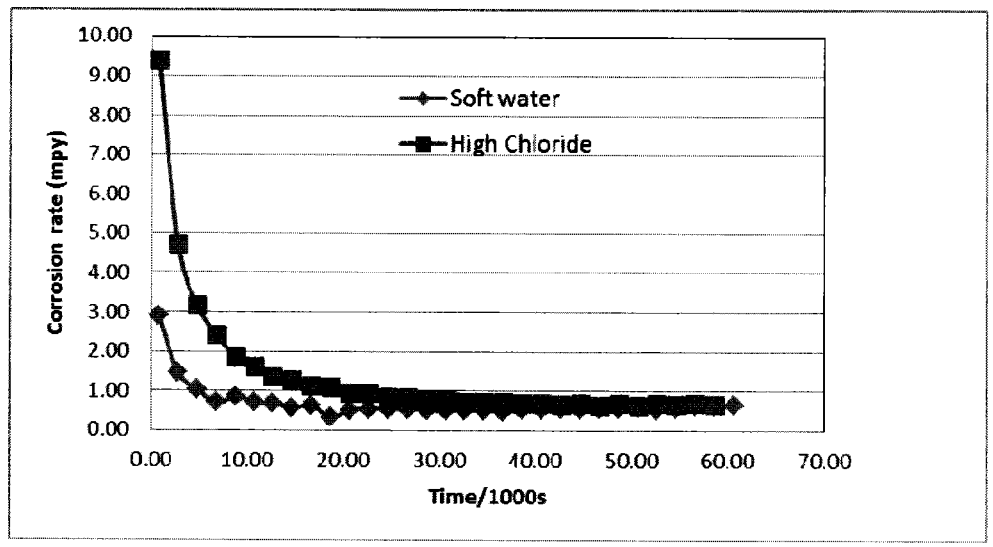
FIG. 7 shows the tendency of the corrosion rate variation with time of a coupon in the test sample comprising the product prepared by Example 1-2 via an electrochemical method.

The test results are shown in FIG. 7. FIG. 7 shows the tendency of the corrosion rate variation with time of the coupon in the test sample comprising the product prepared by Example 1-2 via electrochemical method. It can be seen from FIG. 7 that the initial corrosion rate rapidly decreases within 10 thousand seconds both in the soft water and the high chloride water and decreases to less than 1 mpy within 20 thousand seconds and finally stays steady at less than 1 mpy. It is indicated that the product prepared by example 1-2, namely the maleic acid homopolymer, can obtain excellent corrosion inhibition effect when cooperating with zinc salts and other corrosion inhibitors.

Example 2-1

In a 250 mL three-neck flask equipped with a condenser, 20 g of maleic anhydride and 20 mL of RO water were added. The mixture was heated to 50° C. in a water bath to hydrolyze maleic anhydride and get a clear solution. 8 mg of $FeSO_4.7H_2O$ and 48 mg of KI were added in the above solution, then 1 g of $H_2O_2$ (30 wt. %) was added and the resulting solution was stirred at 50° C. for about 30 minutes. 15 g of 50 wt. % sodium hydroxide aqueous solution were added dropwise into the above solution for about 20 minutes and the temperature was maintained at less than 85° C. After the temperature of the solution was increased up to about 85° C., 30 g of $H_2O_2$ (30 wt. %) were added dropwise for 4 hours under $N_2$ atmosphere. Next, the mixture was maintained at 85° C. for another 3 hours. The ESI Mass spectrogram of the obtained product is shown in FIG. 9.

Figure 9:
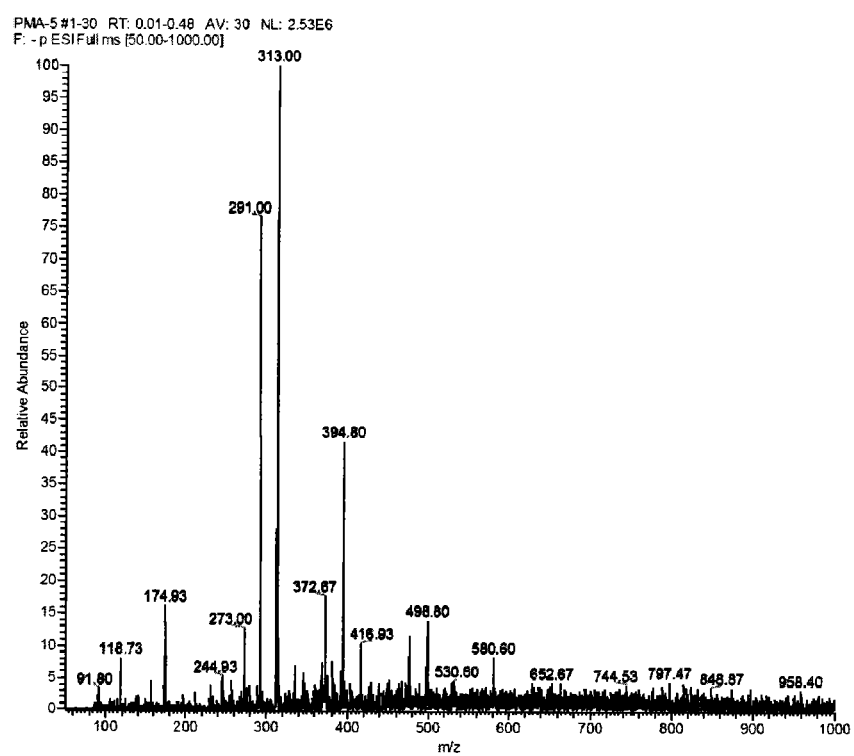
FIG. 9 is an ESI spectrum of the product prepared by Example 2-1.

It can be seen from FIG. 9 that the major signal is at about 300, which indicates that the main product comprises 2-3 repeating units. It is evident that the molecular weight of the product produced in this example is relatively low and has a relatively narrow distribution compared with the existing commercially available polymaleic acid having a high molecular weight and a broad molecular weight distribution.

Figure 8:
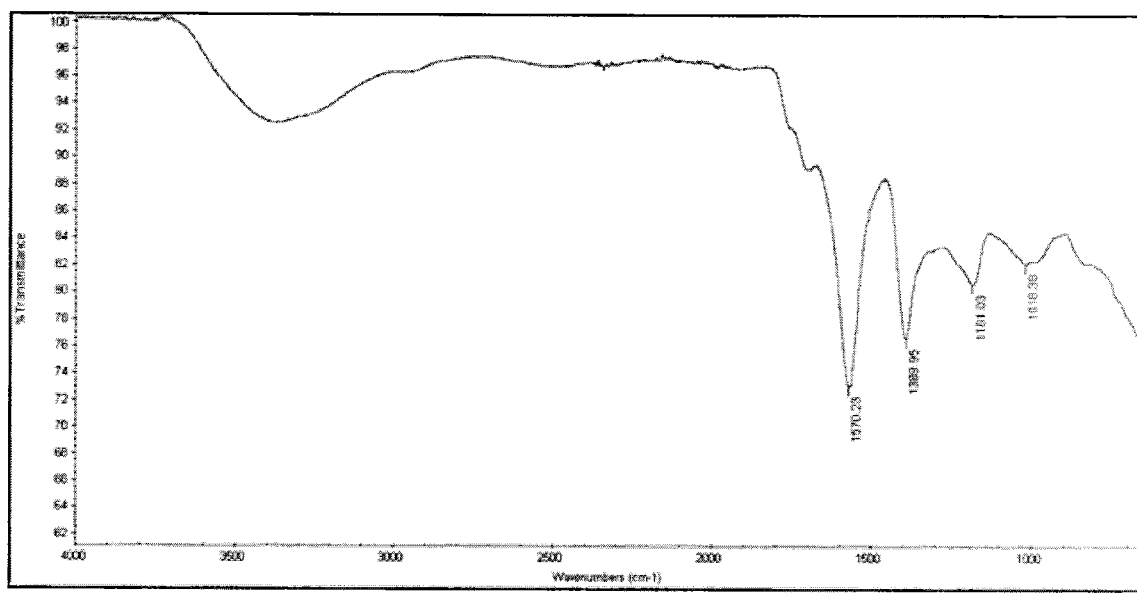
FIG. 8 is an IR spectrum of the product prepared by Example 2-1.

The IR spectrogram of the product is shown in FIG. 8. The characteristic signal of the polymaleic acid can be observed in FIG. 8, and the peaks at 1570.23 cm$^{-1}$ and 1181.03 cm$^{-1}$ respectively correspond to stretching vibration of C=O and C—O in polymaleic acid. It is indicated that the products prepared by example 2-1 mainly are maleic acid polymers having 2 or 3 repeating units of maleic acid.

Example 2-2

Figure 10:
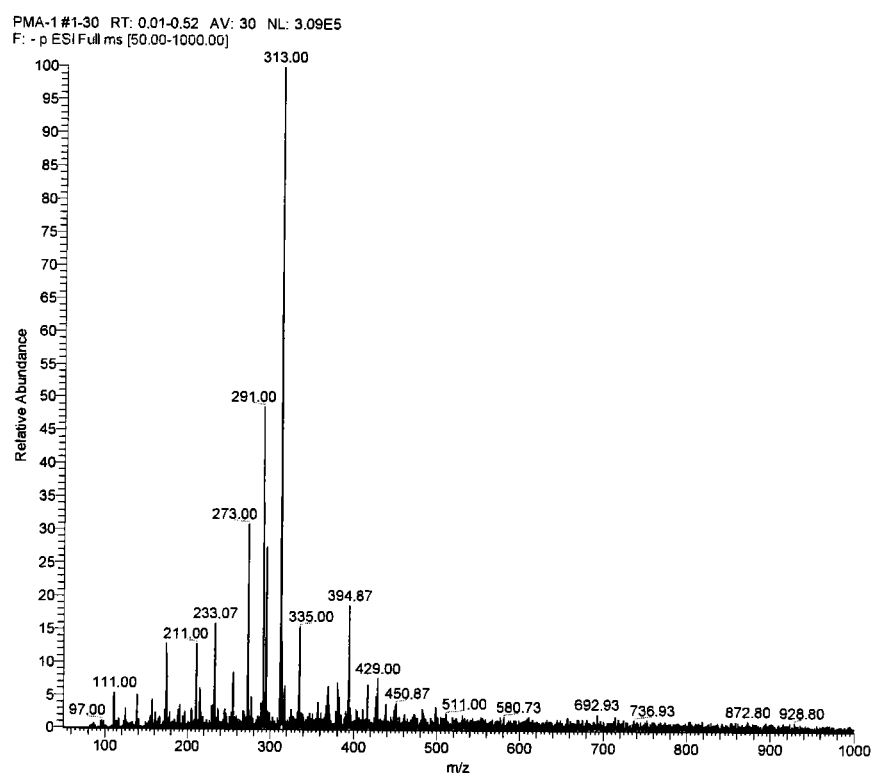
FIG. 10 is an MS spectrum of the product prepared by Example 2-2.

This example is the same as example 2-1, except that the amount of KI was 17 mg, the amount of $H_2O_2$ firstly added was 0.22 g, the amount of $H_2O_2$ secondly added was 11.27 g, and the amount of the catalyst was 0.053 g. The ESI Mass spectrogram of the obtained product is shown in FIG. 10. It can be seen from FIG. 10 that the major molecular weight is between 200~400 Da. The molecular weight corresponds to the dimer of maleic acid (i.e., the number of the repeating units of maleic acid is 2) and the trimer of maleic acid (i.e., the number of the repeating units of maleic acid is 3).

Example 2-3

Figure 11:
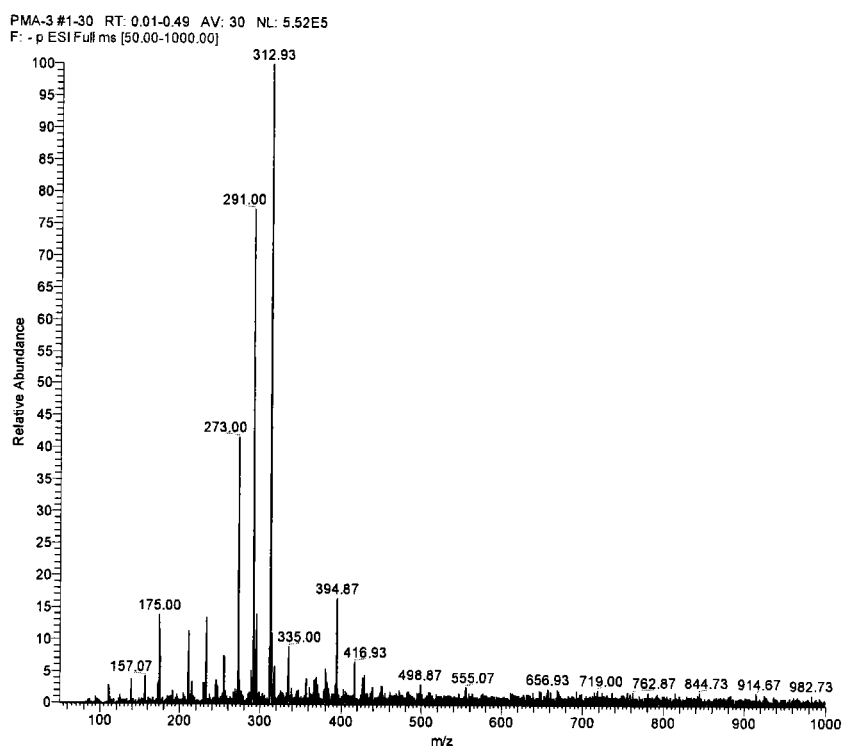
FIG. 11 is an MS spectrum of the product prepared by Example 2-3.

This example is the same as example 2-1, except that the amount of KI was 102 mg, the amount of $H_2O_2$ firstly added was 1.12 g, the amount of $H_2O_2$ secondly added was 45.11 g, and the amount of the catalyst was 0.0053 g. The ESI Mass spectrogram of the obtained product is shown in FIG. 11. It can be seen from FIG. 11 that the major molecular weight is between 200~400 Da. The molecular weight corresponds to the dimer of maleic acid (i.e., the number of the repeating units of maleic acid is 2) and the trimer of maleic acid (i.e., the number of the repeating units of maleic acid is 3).

In Examples 2-1 to 2-3, $H_2O_2$ was selected as the first redox initiator (i.e., the redox initiator firstly added) and the second redox initiator (i.e., the redox initiator secondly added). Alternatively, the first redox initiator and the second redox initiator may be independently one or more materials selected from the group consisting of hydrogen peroxide, sodium persulphate, ammonium persulphate, potassium persulphate, and any combination thereof. The first redox initiator and the second redox initiator may be the same or different.

The amount of the first and second redox initiator added in the reaction may be determined by one of ordinary skill in the art according to the need of the reaction.

Test Example 2—Beaker Test

The corrosion rate of a coupon in the test samples and comparison sample was detected by the beaker test method. The components of the test samples and comparison sample are shown in Table 3 (in soft water), and an iron flake coupon was used.

TABLE 3

| | Composition | | | |
|---|---|---|---|---|
| Sample | AA/AMPS (ppm) | PMA (ppm) | maleic acid homopolymer (HOMA) prepared by Example 2-1 (ppm) | Zn ion (ppm) |
| Comparison sample | 6 | 5 | 0 | 2 |
| Test sample 1 | 6 | 0 | 25 | — |
| Test sample 2 | 6 | 0 | 10 | — |
| Test sample 3 | 6 | 0 | 10 | 2 |
| Test sample 4 | 6 | 0 | 5 | 2 |

Figure 12:
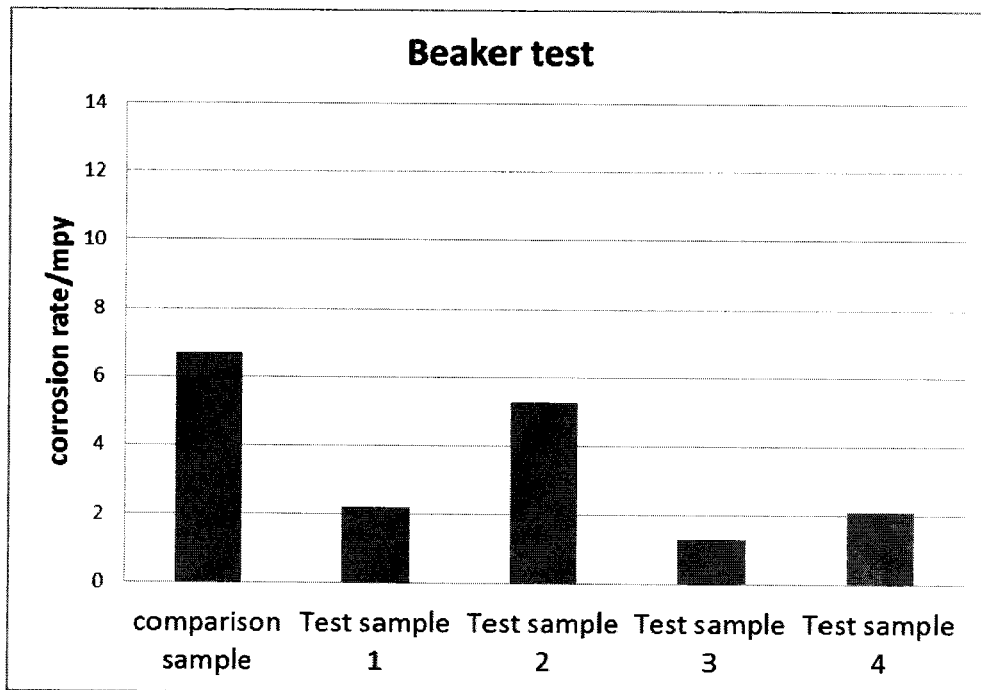
FIG. 12 shows the corrosion rates of a coupon in the test samples comprising different amounts of the product prepared by Example 2-1 in the comparison sample via a beaker test method.

The test results are shown in FIG. 12. FIG. 12 shows the corrosion rates detected in the test samples comprising different amounts of the product prepared by Example 2-1 and in the comparison sample via the beaker test method.

Zinc salt is known as a good corrosion inhibitor for carbon steel in cooling water. However, it can be seen from FIG. 12 that on the condition that Comparison sample and Test samples 1-2 both comprise 6 ppm of AA/AMPS polymer, Test sample 1 or Test sample 2 comprising 10 ppm or 25 ppm of maleic acid homopolymer prepared by Example 2-1, respectively, have obtained better corrosion inhibition effect than the Comparison sample comprising 2 ppm of zinc ion and 5 ppm of PMA (polymaleic acid). Even if the concentration of the maleic acid homopolymer drops to 5 ppm, Test sample 4 still exhibits a good corrosion inhibition effect (the corrosion rate less than 3 mpy) when the maleic acid homopolymer prepared by Example 2-1 cooperates with zinc ion.

Test Examples 3—Electrochemical Test

Test Example 3-1

The corrosion rate of a coupon in the test sample was detected by the electrochemical test method. The test sample comprised (based on the total weight of the solution) 10 ppm of AA/AMPS polymer and 25 ppm of product prepared in example 2-1 and soft water. Ions and pH of the soft water are shown in Table 1. An iron flake coupon was used.

Figure 13:
FIG. 13 shows the tendency of the corrosion rate variation with time of a coupon in the test sample comprising the product prepared by Example 2-1 via an electrochemical method.

The test results are shown in FIG. 13. FIG. 13 shows the tendency of the corrosion rate variation with time of the coupon in the test sample comprising the product prepared by Example 2-1 via the electrochemical method. It can be seen from FIG. 13 that the initial corrosion rate is about 10 mpy because the metal surface is activated and the corrosion rate rapidly decreases within 5 hours and finally stays at less than 4 mpy. It is indicated that the product prepared by example 2-1 cooperating with AA/AMPS polymer as corrosion inhibitor can obtain a good corrosion inhibition effect.

Test Example 3-2

The corrosion rate of a coupon in the test sample was detected by the electrochemical test method. The test sample comprised (based on the total weight of the solution) 10 ppm of AA/AMPS polymer and 25 ppm of product prepared in example 2-3 and soft water. Ions and pH of the soft water are shown in Table 1. An iron flake coupon was used.

The test results are shown in FIG. 14. FIG. 14 shows the tendency of the corrosion rate variation with time of the coupon in the test sample comprising the product prepared by Example 2-3 via the electrochemical method. It can be seen from FIG. 14 that the initial corrosion rate is about 13 mpy because the metal surface is activated, but the corrosion rate rapidly drops to less than 4 mpy within 2 hours and stays at less than or about 4 mpy within two days. It is indicated that the product prepared by example 2-3 cooperating with AA/AMPS polymer as corrosion inhibitor can obtain a good corrosion inhibition effect.

Test Example 4—PCT Test

Comparison sample comprises 6 ppm of AA/AMPS, 5 ppm of PMA and 2 ppm of zinc ion. An iron flake coupon was used.

Test samples (the non-phosphorus corrosion inhibitor) comprise (based on the total weight of the solution) 5 ppm of the product prepared in example 2-1, 6 ppm of AA/AMPS polymer and 2 ppm of Zn ion.

The test results are shown in FIG. 15. FIG. 15 shows the tendency of the total iron ion concentration (T-Fe) variation with time in the water solution comprising the non-phosphorus corrosion inhibitor including the product prepared by Example 2-1 or the comparison sample via pilot cooling tower (PCT) test method.

Under similar water conditions, iron concentration in the cooling water directly reflects the general corrosion rate of carbon steel. Higher iron concentration means higher corrosion rate. It can be seen from FIG. 15 that the iron concentration shown in the curve of the non-phosphorus corrosion inhibitor is lower than that of the comparison sample, which indicates that the non-phosphorus corrosion inhibitor comprising the product prepared by example 2-1 can obtain a good corrosion inhibition effect.

The object to be tested was PCT heat exchanger tubes. The components of the comparison sample and the non-phosphorus corrosion inhibitor are shown above. The corrosion rate is detected by electrochemical testing instrument, and the test results are shown in Table 4.

TABLE 4

| corrosion rate (mpy) | |
|---|---|
| comparison sample | non-phosphorus corrosion inhibitor |
| 3.8 | 2.21 |
| 3.5 | 1.4 |
| 2.84 | 1.38 |

It can be seen from Table 4 that compared with the comparison sample, the non-phosphorus corrosion inhibitor comprising the product prepared by example 2-1 has a lower corrosion rate, which indicates that the product prepared by example 2-1, namely the maleic acid homopolymer, has better corrosion inhibition effect.

Pitting results of the PCT heat exchanger tubes in the aqueous solutions comprising the comparison sample or the non-phosphorus corrosion inhibitor are obtained by using the Zygo interferometer with 1000 times magnification. The results are shown in Table 5.

TABLE 5

| Treatment | Deepest pit depth (micron) | Average depth of top 10 Deepest pits (micron) | Pit density (count/cm$^2$) |
|---|---|---|---|
| comparison sample | 177 | 140.8 | 25.5 |
| non-phosphorus corrosion inhibitor | 125 | 90.5 | 4.2 |

It can be seen from Table 5, compared with the comparison sample, the non-phosphorus corrosion inhibitor comprising the product prepared by example 2-1 presents lower values with respect to the deepest pitting depth, average depth, and pitting density of the top 10 deepest pits. Such results demonstrate that the non-phosphorus corrosion inhibitor comprising the maleic acid homopolymer provided by the example 2-1 can effectively inhibit metal from corrosion, especially iron-containing metal.

Test Example 5

A corrosion inhibitor comprising 10 ppm of the maleic acid homopolymer prepared by example 2-1 and 50 ppm of silicate (calculated by $SiO_2$) was evaluated by the beaker test under the water chemistry in Table 1. After testing for three days, the final average corrosion rate was 0.5 mpy.

In a final set of experiments, the performance of various corrosion inhibitor compositions was tested and the specific corrosion inhibitor compositions that were used are seen below in Table 6.

TABLE 6

| Programs | Corrosion rate (mpy) |
|---|---|
| Working example # 1 as 30 ppm active | 2.56 |
| Working example # 1 as 20 ppm active | 3.48 |
| Working example # 1 as 10 ppm active + 2 ppm Zn | 1.77 |
| Working example # 1 as 5 ppm active + 2 ppm Zn | 4 |
| Working example # 1 as 30 ppm active + 10 ppm MoO4 | 1.45 |
| Working example # 1 as 30 ppm active + 10 ppm SiO2 | 1.12 |
| Working example # 1 as 30 ppm active + 10 ppm PO4 | 0.42 |
| Working example # 1 as 20 ppm active + 20 ppm Tetra Polymer dispersant | 3.5 |
| Working example # 1 as 30 ppm active + 2 ppm Tin | 1.82 |
| Working example # 1 as 30 ppm active + 2 ppm Cerium | 2.2 |
| Blank | 21 |
| Benchmark | 7.4 |

In Table 6, "Working example #1" is defined as a maleic acid oligomer with 2-3 maleic acid repeating units. The "Tetra Polymer dispersant" is a polymer comprising AA, AMPS, t-butyl acrylamide, and itaconic acid.

"Working example #1" can be synthesized by charging about 200 g of DI water, about 500 g of maleic anhydride, concentrated sulfuric acid, and a solid catalyst (as described above) into a reactor under agitation. Steam is introduced into the jacket of the reactor to heat the reactor to about 100° C. Next, about 360 g $H_2O_2$ (content 30%) is dosed into the reactor over the course of about 9 hours with a temperature of the reactor being less than about 115° C. Once all $H_2O_2$ has been added, the contents are stirred for about 2 hours.

All of the compositions and methods disclosed and claimed herein can be made and executed without undue experimentation in light of the present disclosure. While this invention may be embodied in many different forms, there are described in detail herein specific embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more."

For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of inhibiting corrosion of a metallic surface in an aqueous industrial system, comprising:
adding a corrosion inhibitor to the aqueous industrial system, wherein the corrosion inhibitor comprises a maleic acid homopolymer having 2 maleic acid repeating units, wherein a weight average molecular weight of the maleic acid homopolymer is in a range of 200 Da to 250 Da, and wherein the corrosion inhibitor excludes phosphorous and molybdates.

2. The method of claim 1, wherein the maleic acid homopolymer comprises a capping group selected from the group consisting of benzyl, methylbenzyl, phenylethyl, hydrogen, and any combination thereof.

3. The method of claim 1, wherein the corrosion inhibitor further comprises a member selected from the group consisting of a zinc salt, a tungstate, a silicate, and any combination thereof.

4. A method of inhibiting corrosion of a metallic surface in an aqueous industrial system, comprising:
adding a corrosion inhibitor to the aqueous industrial system, wherein the corrosion inhibitor comprises a member selected from the group consisting of a hydrolysate of a maleic anhydride homopolymer having 2 maleic anhydride repeating units, a hydrolysate of a maleic acid homopolymer having 2 maleic acid repeating units, and any combination thereof, wherein a molecular weight of the hydrolysate of the maleic anhydride homopolymer or the hydrolysate of the maleic acid homopolymer is in a range from 200 Da to 250 Da, and wherein the corrosion inhibitor excludes phosphorous and molybdates.

5. The method of claim 4, wherein the corrosion inhibitor further comprises a member selected from the group consisting of a zinc salt, a tungstate, a silicate, and any combination thereof.

6. The method of claim 1, wherein the corrosion inhibitor further comprises a polymer comprising acrylic acid, t-butyl acrylamide, itaconic acid, and 2-acrylamido-2-methylpropane sulfonic acid.

7. A method of inhibiting corrosion of a metallic surface in an aqueous industrial system, comprising:
adding a corrosion inhibitor to the aqueous industrial system, wherein the corrosion inhibitor comprises:
a maleic acid homopolymer having 2 maleic acid repeating units; and
a phenylethyl capping group,
wherein a weight average molecular weight of the maleic acid homopolymer is in a range of 200 Da to 250 Da, and wherein the corrosion inhibitor excludes phosphorous and molybdates.

8. The method of claim 1, wherein the corrosion inhibitor is added to the aqueous industrial system at a concentration of about 5 ppm or less.

* * * * *